Jan. 26, 1965   G. PASCOE ETAL   3,166,846
APPARATUS FOR PLOTTING TWO DIMENSIONAL DATA
Filed March 29, 1961   2 Sheets-Sheet 1

GEORGE PASCOE
CARL S. CSEKE
INVENTORS

BY John L. Faulkner
Thomas H. Oster

ATTORNEYS

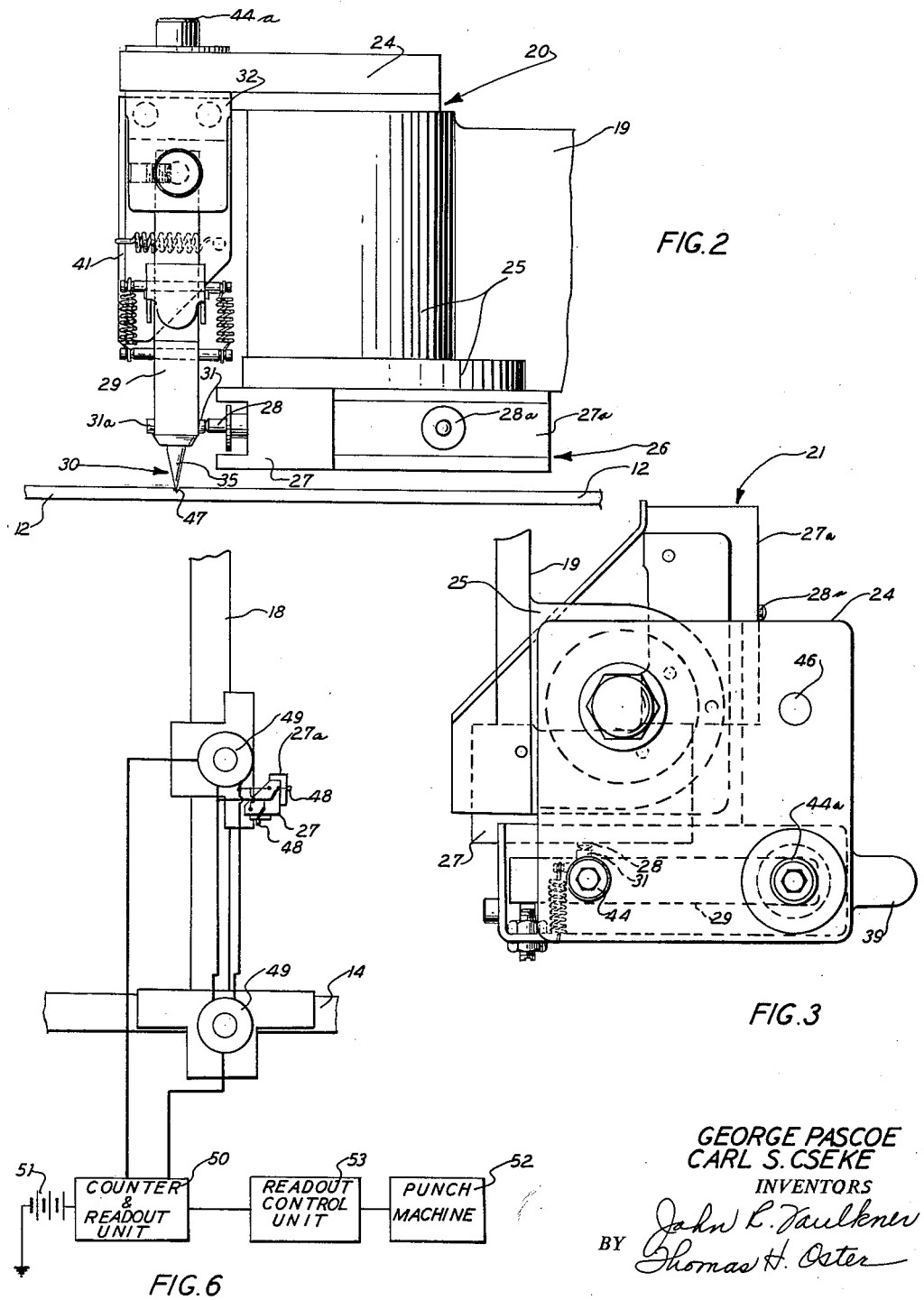

United States Patent Office 3,166,846
Patented Jan. 26, 1965

3,166,846
APPARATUS FOR PLOTTING TWO
DIMENSIONAL DATA
George Pascoe and Carl S. Cseke, Dearborn, Mich.,
assignors to Ford Motor Company, Dearborn, Mich.,
a corporation of Delaware
Filed Mar. 29, 1961, Ser. No. 99,254
9 Claims. (Cl. 33—1)

This invention relates generally to a plotting apparatus and more particularly to an apparatus for accurately locating a series of points on a contour line on the surface of a draft plate to assist in transcribing these points to templates for use in the preparation of tooling.

Conventional methods for plotting contour lines inscribed in the flat surface of a draft plate utilize a plotting apparatus generally referred to as a coordinatograph which is placed over the contour line to be read on the surface of the draft plate.

The coordinatograph comprises a frame and ordinate and abscissa straight edges having movable carriages mounted on guides thereon. The ordinate straight edge, which is normal to the abscissa straight edge, is connected at one end to the abscissa carriage. An optical probe attached to the ordinate carriage is positioned over any point lying on the contour line to be scanned. When the optical probe is focused over the point located on the contour line, the coordinate values of this point are read on the scales attached to the ordinate and abscissa straight edges. These values are then plotted on a corresponding object such as a template sheet.

The readings are repeated for a series of points lying on the contour line until the entire contour line is reproduced to scale on the template sheet.

In the design of sheet metal panels for automobiles, for example, various contour designs are transcribed on metal draft plates by manual means to assure stability of dimensional designs. These draft plates are usually made out of a stable light-weight metal with their surfaces painted and having "X" and "Y" grid lines scribed into one of their surfaces. From the draft plate layouts, accurate templates are prepared to facilitate the fabrication of tooling required for the reproduction of sheet metal parts on a high volume basis. The current conventional coordinatograph method, which utilizes an optical probe, does not readily lend itself to recently developed electronic control systems and related instruments used in the preparation of templates for tooling.

To obtain a reading of a series of points expressed in "X" and "Y" coordinate values, the optical probe of the current coordinatograph is focused on the contour line by the operator. To transcribe the readings of a series of points when the coordinatograph is in position, a switch may be actuated manually so that a suitable magnetic or photoelectric pickup mounted on the coordinatograph dials sends an impulse to an electronic counter and readout unit. This unit forwards these readings electronically to a card or tape punch unit which records the series of located points.

In the manual operation of a conventional coordinatograph having an optical probe, visual effort is required in positioning and focusing the probe. The continuous operation of this tedious task by the operator has resulted in inaccuracies due to improper positioning of the probe. Also, conventional methods are rather slow in transcribing complex multicurved contour lines since a large number of points have to be located.

In our copending application Serial No. 93,146 filed on March 3, 1961, the optical probe of the coordinatograph is replaced by a mechanical probe assembly which is completely detached from the plotting instrument. After the probe pin of the detached mechanical probe assembly is confined in a contour line inscribed on the draft plate, it is still necessary to manually position the ordinate carriage so that its attached locating member is firmly located against the locating surfaces of the detached mechanical probe assembly before a reading of a point can be obtained.

This invention provides for a further improvement of a mechanical probe for a coordinatograph. This improved mechanical probe assembly comprises a probe pin carried by a probe plate which is pivotally connected to the ordinate carriage of a conventional coordinatograph. As the ordinate carriage of the plotting instrument approaches the scribed contour line to be scanned on the surface of a draft plate, the probe pin is manually lowered by the operator. Then the probe plate, which is maintained by a spring at a slight angle with a plane normal to the surface of the draft plate, is urged across the contour line until the probe pin becomes confined in the depression formed by the scribed contour line. The carriage is manually adjusted until a locating surface on the pivotable probe plate comes in contact with a locating pin attached to the carriage while the probe pin remains confined in the contour line. The probe pin is then oriented in relation to the reference axis of the plotting instrument. The coordinate values of the point located by the probe pin is then plotted to obtain a corresponding point on a template sheet.

The apparatus of this invention eliminates the use of the optical probe of the conventional coordinatograph and does not require a detached probe assembly as disclosed in our copending application Serial No. 93,146, filed on March 3, 1961, thereby facilitating the operator's task of visually locating a series of points lying on a contour line or of manually translating a detached probe assembly.

The tiltable probe assembly of this invention may also be adapted to make an electrical contact to energize an electrical circuit to give an instantaneous reading when the probe pin is orientated in relation to the reference axis of the plotting instrument.

The object of this invention is to provide an improved plotting apparatus which will determine with precision and minimum manual and visual effort the "X" and "Y" values of a series of points lying on a contour line scribed into the surface of a draft plate.

A further object is to provide a mechanical probe which will activate an electrical circuit instantaneously to record the coordinate values of a point after being located by the probe pin of the coordinatograph.

Further objects and advantages of the present invention will become more apparent with the following description, reference being had to the accompanying drawings wherein:

FIGURE 2 is a side elevational view of the tiltable probe assembly in position against the locating plate mounted upon the ordinate carriage;

FIGURE 3 is a plan view of the tiltable probe assembly as seen in FIGURE 2;

FIGURE 6 is a schematic diagram of an electrical circuit depicting the electrical contact switches mounted upon the locating plate.

Figure 1:
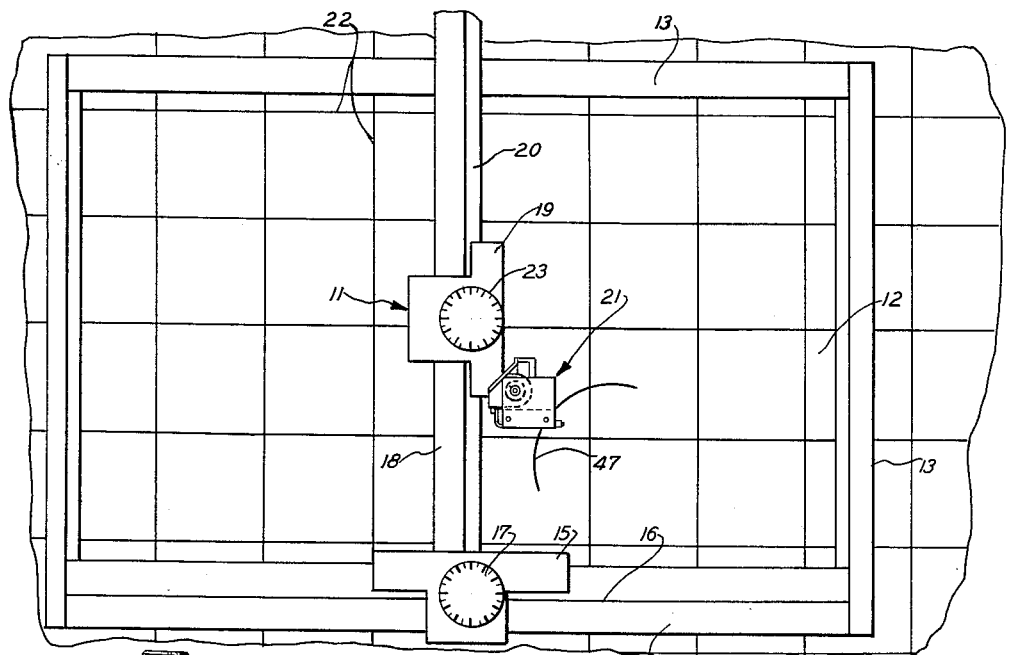
FIGURE 1 is a plan view showing a coordinatograph of this invention mounted on a draft plate.

In FIGURE 1 is seen a plan view of a two dimensional plotting instrument, generally called a coordinatograph 11, positioned on the surface of a draft plate 12. The coordinatograph 11 has a rectangular frame 13 with one side of the frame 13 being an abscissa straight edge 14. An abscissa carriage 15 moves along a guide 16 which is mounted on the abscissa straight edge 14. A rotating dial 17, attached to the abscissa carriage 15, is calibrated to give a reading of the "X" coordinate value of a located point with respect to a given "Y" axis. An ordinate straight edge 18 extending normal to the abscissa straight edge 14 has one end attached to the abscissa carriage 15. An ordinate carriage 19, which is movable along a second guide 20, supports a tiltable probe assembly 21. The tiltable probe assembly 21 extends over the surface of the draft plate 12 which has equally spaced "X" and "Y" grid lines 22 scribed on its entire surface.

A second rotating dial 23 attached to the ordinate carriage 19 is calibrated to give a reading of the "Y" coordinate value of a located point in relation to a given "X" axis.

In FIGURE 2 is seen a side elevational view of the tiltable mechanical probe assembly 21 which is attached to the ordinate carriage 19. The conventional ordinate carriage 19 of the coordinatograph 11 is modified to support the tiltable probe assembly 21 by the addition of a support plate 24, a support member 25, and a locating device 26 comprising two contact plates 27 and 27a. Each contact plate 27 and 27a has a horizontal locating pin 28 and 28a extending from its outer side surface. The contact plates 27 and 27a are attached to the support member 25 so that their outer side surfaces are normal to each other and substantially parallel to the "X" and "Y" grid lines 22.

In FIGURE 3 is seen a plan view of the tiltable probe assembly 21 depicting the stationary support plate 24 which is mounted parallel to the surface of the draft plate 12 and overhanging the outer side surfaces of the contact plates 27 and 27a. The tiltable probe assembly 21 includes a substantially vertical probe plate 29 which is pivotally attached to the support plate 24. The probe plate 29 is provided with a probe 30 and two horizontally extending stop pins 31 and 31a, each pin 31 having a flat locating end surface. When the locating surface of one of the stop pins 31 is in contact with one of the locating pins 28 of the locating device 26, the location of the probe 30 with respect to the coordinatograph 11 is established.

Figures 4, 5:
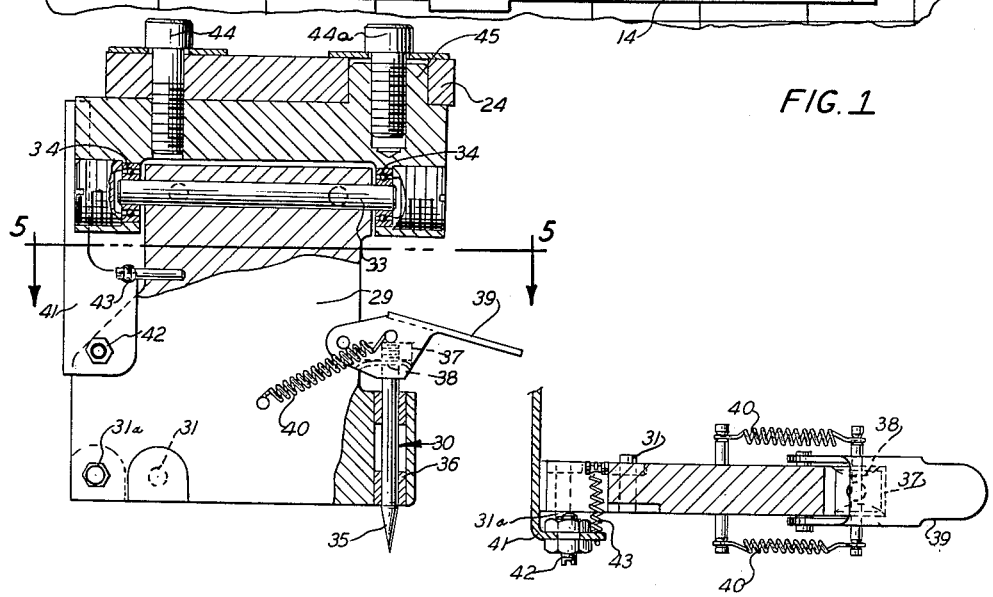
FIGURE 4 is a side elevation partially in section of the tiltable probe assembly.
FIGURE 5 is a sectional view taken along line 5—5 of FIGURE 4.

In FIGURE 4 is seen a side elevational view, partially in section, of the tiltable probe assembly 21. In FIGURE 4 can be seen that the pivotable probe plate 29 is secured to the bifurcated end of a hinge plate 32 by a hinge pin 33. Both ends of the hinge pin 33 are journaled in bearings 34 mounted in the bifurcated end of the hinge plate 32. The probe plate 29, which pivots around its hinge plate 33, supports the probe 30. This probe 30 comprises a probe pin 35 which is mounted to slide axially in a bushing 36 with the pointed tip of the probe pin 35 extending below the lower end of the probe plate 29.

FIGURE 5 is a sectional view taken through the probe plate 29. As seen in FIGURE 5, the probe pin 35 has a head 37 which rides on a pair of prongs 38 attached to an articulated handle 39. Rotation of the handle 39 will raise or lower the prongs 38 which, in turn, will cause the probe pin 35 to move axially. The handle 39 is fastened to two counterbalanced springs 40. These springs 40 will either retain the probe pin 35 in an upward position if the handle 39 is substantially rotated in a counterclockwise direction, or retain the probe pin 35 in a downward direction if the handle 39 is substantially rotated in a clockwise direction.

In FIGURES 4 and 5 can also be seen a bracket 41 attached to the hinge plate 32. The bracket 41 is provided with a stop 42 to restrict the pivotal movement of the probe plate 29. This bracket 41 is connected to the probe plate 29 by a spring 43 which maintains the probe plate 29 and its probe 30 at a slight angle with the vertical plane.

To permit the pivotal movement of the pivotable probe plate 29 in a vertical plane normal to the probe plate's vertical plane as illustrated in FIGURE 2, the probe plate 29 and the hinge plate 32 can be disconnected from the stationary support plate 24 by removing bolt 44 best seen in FIGURE 3. The disconnected probe plate 29 and the hinge plate 32 can then be rotated about stub shaft 45 in a vertical position normal to its original position by placing the bolt 44 through bolt hole 46 and retaining the other bolt 44a in its center bolt hole location. Locating pins 28a of the locating device will now be in contact with the locating surface of the stop pin 31a. The repositioning of the probe plate 29 assists in locating points on a scribed contour line 47 which may extend in more than one direction.

In the operation of the improved coordinatograph 11 of this invention, the tiltable probe assembly 21, which is attached to the ordinate carriage 19, is moved across the draft plate 12 with its pointed probe pin 35 in an upward position. As contour line 47 is approached, the probe pin 35 is manually lowered by rotating the spring loaded handle 39 in a clockwise direction.

As the lowered probe pin 35 is urged across the contour line 47, the tip of this probe pin 35 becomes confined in the depression formed by the scribed contour line 47.

The probe pin 35 and the probe plate 29 are maintained at a slight angle with the vertical plane by the spring 43 so that the locating surface of stop pin 31 does not make contact with the locating pin 28 before the position of the probe 30 is established with respect to the coordinatograph 11.

At this time, a very slight horizontal manual adjustment of the ordinate carriage is made until the locating surface of one of the stop pins 31 or 31a makes contact with one of the locating pins 28 or 28a while the tip of the probe pin 35 remains confined in the depression formed by the scribed contour line 47.

When contact between the stop pin 31 and the locating pin 29 is established, the plane of the tiltable probe assembly 21 is orientated in relation to the reference axis of the plotting mechanism of the coordinatograph 11 which will permit an accurate numerical measurement of the coordinate value of the point lying on the contour line 47 as located by the tip of the probe pin 34.

In FIGURE 6 is seen a schematic diagram of an electronic numerical recording system which may be utilized to improve the rapidity of recording the coordinate values of the points located on the contour line 47 by probe 30. Two contact switches 48 are mounted on the contact plates 27 and 27a to replace the locating pins 28 and 28a. When the locating surface of one of the horizontal stop pins 31 of the probe plate 29 is in contact with either of the two contact switches 48, an electrical circuit which includes the electronic numerical recording system is activated.

The electronic numerical recording system may comprise suitable magnetic or photoelectric pickup devices 49 which can be readily mounted on each dial shaft of the coordinatograph 11. The pickup device 49, which may be designed to generate one impulse for each .001 of an inch or some other suitable increment of movement of the measuring head, is wired to an electronic counter and readout unit 50 connected to a power source 51. This unit 50 automatically adds or subtracts the impulses received according to the direction of measurement. Accumulative "X" and "Y" numerical values are entered in the counter and readout unit 50 when the electronic circuit is energized by the closing of one of the two contact switches 48.

The accumulated coordinate values of the located points may be stored in the counter or readout unit 50 or, if desired, recorded on punch cards or tape by a punch machine 52 which is electrically connected to a readout control unit 53. The punch cards or tape may then be used to obtain an appropriate equation of the given contour line 47 or activate template cutting machines according to the punch or tape data.

We claim:

1. A coordinate measuring system comprising a coordinate measuring apparatus and a numerical control recording means operative for recording coordinate values measured by said coordinate measuring apparatus upon being actuated, said coordinate measuring apparatus including a carriage means adapted to move in two dimensions over a surface of a draft plate having a line scribed thereon, a locating device, a probe assembly, and means for determining the position of said locating device, said locating device and said probe assembly supported by said carriage means, said probe assembly including a pivotable probe plate, said probe plate being provided with a pointed probe and a locating surface, said pointed probe adapted to be confined in said scribed line, said coordinate measuring apparatus accurately establishing the location of said locating device with respect to said pointed probe confined in said line when said locating surface is in contact with said locating device, said locating device including means for actuating said numerical control recording means when said locating surface is in contact with said locating device.

2. A coordinate measuring system comprising a coordinate measuring apparatus and a numerical recording means operative for recording coordinate values measured by said coordinate measuring apparatus upon being actuated, said coordinate measuring apparatus including carriage means supporting a locating device and a probe assembly provided with a probe and a locating surface, and measuring means for determining the position of said probe, said measuring means establishing the coordinate value of said probe when said locating surface is in contact with said locating device, said locating device including means for actuating said numerical recording means when said locating surface is in contact with said locating device.

3. A coordinate measuring system comprising a coordinate measuring apparatus and an electrical numerical recording and transcribing system interconnected with said coordinate measuring apparatus, said coordinate measuring apparatus including carriage means adapted to move in two dimensions over the surface of a draft plate having a line scribed thereon, a locating device, a probe assembly, said carriage means supporting said locating device and said probe assembly, said probe assembly including a pivotable probe plate, said probe plate being provided with a pointed probe and a locating surface, said pointed probe adapted to be confined in said scribed line, and pickup means for measuring the movement of said pointed probe, said pickup means establishing the location of said pointed probe confined in said line when said locating device is in contact with said locating surface, said electrical numerical recording and transcribing system upon being actuated recording the established location of said pointed probe confined in said line and transcribing the established location thereof, said locating device including means for actuating said electrical numerical recording and transcribing system when said locating surface is in contact with said locating device.

4. A coordinate measuring apparatus comprising a probe assembly and a carriage means movable in two dimensions over a surface of a draft plate having a recessed line scribed thereon, said carriage means including a locating device and means for determining the position of said locating device, said probe assembly having a locating surface and a probe, and means for mounting said probe assembly on said carriage means to allow for movement of said probe assembly with respect to said carriage means to a position of contact between the locating surface of said probe assembly and said locating device on said carriage means, said mounting means also urging said probe into said recessed line when said carriage means is moved over the surface of said draft plate, said probe assembly being moved into a contact position after said probe is in said recessed line, said coordinate measuring apparatus establishing the coordinate value of said probe in said line when said probe assembly is in contact position with said locating device.

5. A coordinate measuring system comprising a coordinate measuring apparatus, an electronic numerical device adapted to record coordinate values measured by said coordinate measuring apparatus, said coordinate measuring apparatus comprising a carriage adapted to move in two dimensions over a surface of a draft plate having a line scribed thereon, a contact plate and a probe assembly attached to said carirage, said probe assembly comprising a pivotable probe plate, said probe plate being provided with a pointed probe and a locating surface, said pointed probe constructed and arranged to be confinable in said scribed line, at least one contact switch mounted on said contact plate, said contact switch being associated with said coordinate measuring apparatus and said electronic numerical control device, said coordinate measuring apparatus establishing the coordinate value of said pointed probe confined in the scribed line with respect to a known abscissa axis and a known ordinate axis when said locating surface is in contact with said contact switch, thereby also energizing said electronic numerical device.

6. A coordinate measuring apparatus comprising a probe and a carriage movable in two dimensions over a surface of a draft plate having a recessed line scribed thereon, said carriage including a locating device and means for determining the position of said locating device, and a generally vertically disposed probe plate having a locating surface and a probe, and means for pivotally mounting said probe plate on said carriage to allow for movement of said probe plate to a position of contact between the locating surface of said probe plate and said locating device on said carriage, said mounting means also urging said probe of said probe plate into said recessed line when said carriage is moved over the surface of said draft plate, said probe plate being moved into a contact position after said probe is in said recessed line, said coordinate measuring apparatus accurately establishing the coordinate value of said probe in said recessed line with respect to a known abscissa axis and a known ordinate axis when the locating surface on said probe plate is in contact with said locating device.

7. The apparatus as described in claim 6 and which is further characterized in that said probe has an adjusting means, said adjusting means for said probe comprising a spring loaded handle and a pair of prongs, said probe having a pointed tip at one end and having a head on the other end, said head resting on said prongs, rotation of said handle adapted to raise or lower said head and thereby placing the pointed tip of said probe in a raised or lowered position respectively in relation to the surface of said draft plate, said pointed tip of the probe only in its lowered position being urged into said recessed line by said mounting means when the carriage is moved over the surface of the draft plate.

8. The apparatus as described in claim 6 and which is further characterized in that said locating device comprises a pair of locating plates with locating surfaces normal to each other, each locating plate having a horizontally extending locating pin.

9. The apparatus as described in claim 6 and which is further characterized in that said mounting means for said probe plate includes a positioning means for selectively positioning said probe plate in a first vertical plane or a second vertical plane normal to said first vertical plane, said locating device being disposed in a first vertical plane and a second vertical plane so as to allow the locating surface of said probe plate in either the first or the second vertical plane to be moved into a position of contact therewith.

References Cited by the Examiner
UNITED STATES PATENTS

| | | | |
|---|---|---|---|
| 2,336,581 | 12/43 | Young | 33—23 |
| 2,629,173 | 2/53 | Mottet | 33—32 |
| 2,873,535 | 2/59 | Gordon et al. | 33—189 |
| 3,024,396 | 3/62 | Peckjian | 318—29 X |
| 3,088,209 | 5/63 | Schividefsky | 33—20 |

FOREIGN PATENTS 771,607   4/57   Great Britain.

ISAAC LISANN, *Primary Examiner.*